(12) United States Patent  
Cui et al.

(10) Patent No.: US 10,782,551 B2  
(45) Date of Patent: Sep. 22, 2020

(54) DISPLAY DEVICE

(71) Applicant: WUHAN CHINA STAR OPTOELECTRONICS TECHNOLOGY CO., LTD., Hubei (CN)

(72) Inventors: Hongqing Cui, Hubei (CN); Guowei Zha, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 848 days.

(21) Appl. No.: 15/327,482

(22) PCT Filed: Dec. 23, 2016

(86) PCT No.: PCT/CN2016/111641  
§ 371 (c)(1),  
(2) Date: Jan. 19, 2017

(87) PCT Pub. No.: WO2018/090432  
PCT Pub. Date: May 24, 2018

(65) Prior Publication Data  
US 2019/0384097 A1  Dec. 19, 2019

(30) Foreign Application Priority Data  
Nov. 21, 2016 (CN) .......................... 2016 1 1039222

(51) Int. Cl.  
*G02F 1/1335* (2006.01)  
*G02F 1/13357* (2006.01)

(52) U.S. Cl.  
CPC ...... *G02F 1/133514* (2013.01); *G02F 1/1336* (2013.01); *G02F 2001/133614* (2013.01); *G02F 2202/36* (2013.01)

(58) Field of Classification Search  
CPC .......... G02F 2001/133614; G02F 2001/01791; G02F 1/133617; G02F 2201/44;  
(Continued)

(56) References Cited

U.S. PATENT DOCUMENTS

2013/0341588 A1  12/2013  Jeon et al.  
2014/0362556 A1*  12/2014  Cho ........................ B32B 3/30  
                                                   362/19

(Continued)

FOREIGN PATENT DOCUMENTS

CN  103514813 A  1/2014  
CN  104965341 A  10/2015  
(Continued)

*Primary Examiner* — Michael H Caley  
*Assistant Examiner* — Mariam Qureshi  
(74) *Attorney, Agent, or Firm* — WPAT, PC

(57) ABSTRACT

A display device is provided in the disclosure. A color filter substrate of a liquid crystal display panel has a quantum rod light-emitting layer disposed thereon, which includes a plurality of separation members arranged in a form of array and a quantum rod material manufactured in the separation members. The beneficial effects are that the display device has the quantum rod light-emitting layer with polarization ability disposed on an external surface of the liquid crystal display panel, and by a combination of excitation of the quantum rod, polarization property of fluorescence spectroscopy, and ability of the liquid crystal to change polarization, a liquid crystal television having high brightness and high color gamut can be carried out.

7 Claims, 2 Drawing Sheets

(58) Field of Classification Search
CPC ............. G02F 1/133528; H01L 51/502; H01L 31/035218; H01L 51/5012; H05B 33/00
See application file for complete search history.

(56) References Cited

U.S. PATENT DOCUMENTS

| | | | |
|---|---|---|---|
| 2016/0320664 A1* | 11/2016 | Kang | G02F 1/133528 |
| 2016/0334556 A1 | 11/2016 | Wu et al. | |
| 2017/0059985 A1* | 3/2017 | Park | G03F 7/0002 |
| 2017/0082892 A1* | 3/2017 | Chung | G02F 2/02 |
| 2017/0136490 A1* | 5/2017 | Sanchot | B05D 1/005 |
| 2017/0153368 A1* | 6/2017 | Yoon | G02F 1/133512 |

FOREIGN PATENT DOCUMENTS

| | | |
|---|---|---|
| CN | 106094316 A | 11/2016 |
| TW | 201640153 A | 11/2016 |

\* cited by examiner

DISPLAY DEVICE

TECHNICAL FIELD OF THE DISCLOSURE

The present invention relates to a display technology, and more particularly, to a quantum rod display device.

BACKGROUND OF THE DISCLOSURE

Quantum dots are extreme small inorganic nanocrystals and are invisible to human eyes. Whenever excited by light rays, the quantum dots will emit very pure colorful light rays. Currently, a backlight source using a quantum dot material is a backlight with purest colors. Quantum dot televisions use the color-purest quantum dot sources as their backlight sources, and therefore carry out a revolution in full color-gamut display and the most real restoration of image colors. The quantum dot has a unique property. That is, whenever exited by light or electricity, the quantum dot gives out colorful light. The color of the light is determined by the composed material and the size of the quantum dot. Generally, a small particle of the quantum dot emits short wavelengths while a large particle emits long wavelengths. A quantum dot of two nanometers can absorb the blue light to show green color. A quantum dot of eight nanometers can absorb the blue light to show red color. This characteristic makes the quantum dot be able to change the color of light rays emitted from a light source.

FIG. 1 is a diagram showing an existing quantum dot liquid crystal display device, which includes a reflection plate 101, a light guiding plate 102, an optical film 103, a lower polarization plate 104, an array substrate 105, a liquid crystal layer 106, a quantum dot light-emitting layer 107, a color resistant layer 108, a black matrix 112, a color filter substrate 109, and an upper polarization plate 110 sequentially disposed from top to bottom. The light guiding plate 102 has a blue light source 111 disposed at a light-entrance side thereof. Light rays emitted from the quantum dot are not polarized. After the quantum dot in the photoresist of the color filter is excited by the linearly polarized blue light passing through the lower polarization plate, the resulting light has various types of polarization. No matter what type of polarization the blue light used for the excitation is, there always has a half amount of light from the excited quantum dot passing through the upper polarization plate. Therefore, it is difficult to carry out a display of a complete dark state or a black image and it is unable to carry out a control on brightness by using the ability of the liquid crystal to change polarization.

Above all, the existing quantum dot liquid crystal display device cannot efficiently control the non-polarized characteristic of quantum dot light emission, resulting in difficult for a liquid crystal panel to carry out a display of a complete dark state or a black image, and also resulting in low efficiency in screen brightness, thereby affecting the effect of a displayed image.

SUMMARY OF THE DISCLOSURE

The objective of the present invention is to provide a display device for increasing the purity of a displayed screen and further improving the display effect.

To solve above technical problems, the present invention provides a display device, comprising a liquid crystal display panel; and a blue backlight module disposed on a lower surface of the liquid crystal display panel, configured to provide a backlight for the liquid crystal display panel, wherein the liquid crystal display panel comprises: an array substrate; a color filter substrate disposed on an upper surface of the array substrate, the color filter substrate having a color resistant layer and a first black matrix disposed on a surface thereof and having a flat layer disposed on an upper surface of the color resistant layer; and a quantum rod light-emitting layer disposed on an upper surface of the flat layer, wherein the quantum rod light-emitting layer comprises: a plurality of separation members arranged in a form of array and a quantum rod material manufactured in the separation members, wherein each separation member is disposed corresponding to one sub-pixel of the color resistant layer and arranged above said one sub-pixel, a color of the quantum rod material in the separation member corresponds to that of the sub-pixel of the color resistant layer located below the quantum rod material, and all of quantum rods in the quantum rod material are arranged along a same direction, wherein in manufacturing the quantum rod light-emitting layer, putting the color filter substrate into a container, which has a certain amount of electrodes disposed thereon, generating a transversal electric field on a surface of the color filter substrate by applying different bias voltages to make the quantum rods aligned with the electric field, and utilizing an UV curing or a thermal curing to make an orientation of the quantum rods fixed.

In accordance with a preferred embodiment of the present invention, the backlight module has an optical film which has a lower polarization plate disposed thereon, the quantum rod light-emitting layer has an upper polarization plate disposed thereon, and transmission axes of the upper polarization plate and the lower polarization plate are perpendicular to each other.

In accordance with a preferred embodiment of the present invention, the orientation of the quantum rods is consistent with the transmission axis of the upper polarization plate located above the color filter substrate.

In accordance with a preferred embodiment of the present invention, the separation members are a SU-8 photoresist, which is a transparent material at visible wavelengths.

In accordance with a preferred embodiment of the present invention, the separation member has a concave part formed therein and the concave part is filled with the quantum rod material.

In accordance with a preferred embodiment of the present invention, the size of an opening of the concave part corresponds to that of an opening of a corresponding sub-pixel.

In accordance with a preferred embodiment of the present invention, the quantum rod light-emitting layer has a water vapor and oxygen insulation layer disposed on an upper surface thereof.

In accordance with a preferred embodiment of the present invention, the water vapor and oxygen insulation layer has a second black matrix manufactured on a surface thereof, and the positions of openings of the second black matrix corresponds to that of the first black matrix.

In accordance with a preferred embodiment of the present invention, the quantum rod is a core-shell structure and a center of the quantum rod has a quantum dot.

In accordance with a preferred embodiment of the present invention, a particle size of the quantum dot is selected to be 1-10 nm, and the particle sizes of red and green quantum dots are different from each other.

The present invention further provides a display device, comprising: a liquid crystal display panel; and a blue backlight module disposed on a lower surface of the liquid crystal display panel, configured to provide a backlight for the liquid crystal display panel, wherein the liquid crystal display panel comprises: an array substrate; a color filter substrate disposed on an upper surface of the array substrate, the color filter substrate having a color resistant layer and a first black matrix disposed on a surface thereof and having a flat layer disposed on an upper surface of the color resistant layer; and a quantum rod light-emitting layer disposed on an upper surface of the flat layer, wherein the quantum rod light-emitting layer comprises: a plurality of separation members arranged in a form of array and a quantum rod material manufactured in the separation members, wherein each separation member is disposed corresponding to one sub-pixel of the color resistant layer and arranged above said one sub-pixel, a color of the quantum rod material in the separation member corresponds to that of the sub-pixel of the color resistant layer located below the quantum rod material, and all of quantum rods in the quantum rod material are arranged along a same direction.

In accordance with a preferred embodiment of the present invention, all of the quantum rods in the quantum rod material are arranged along a same direction.

In accordance with a preferred embodiment of the present invention, the orientation of the quantum rods is consistent with the transmission axis of the upper polarization plate located above the color filter substrate.

In accordance with a preferred embodiment of the present invention, the separation members are a SU-8 photoresist, which is a transparent material at visible wavelengths.

In accordance with a preferred embodiment of the present invention, the separation member has a concave part formed therein and the concave part is filled with the quantum rod material.

In accordance with a preferred embodiment of the present invention, the size of an opening of the concave part corresponds to that of an opening of a corresponding sub-pixel.

In accordance with a preferred embodiment of the present invention, the quantum rod light-emitting layer has a water vapor and oxygen insulation layer disposed on an upper surface thereof.

In accordance with a preferred embodiment of the present invention, the water vapor and oxygen insulation layer has a second black matrix manufactured on a surface thereof, and the positions of openings of the second black matrix corresponds to that of the first black matrix.

In accordance with a preferred embodiment of the present invention, the quantum rod is a core-shell structure and a center of the quantum rod has a quantum dot.

In accordance with a preferred embodiment of the present invention, a particle size of the quantum dot is selected to be 1-10 nm, and the particle sizes of red and green quantum dots are different from each other.

The beneficial effects of the present invention are that compared to the existing quantum dot liquid crystal display device, the display device of the present invention has a quantum rod light-emitting layer with polarization ability disposed on an external surface of a liquid crystal display panel, thereby increasing the purity of a displayed screen and further improving the display effect.

BRIEF DESCRIPTION OF THE DRAWINGS

For a better understanding of technical schemes of the existing skills or the embodiments, the attached figures required to be used to illustrate the existing skills or the embodiments are introduced briefly. Apparently, the following figures only represent some embodiments of the present invention, the persons with ordinary skill in the art to which the subject invention pertains will more readily understand and obtain other attached figures based on these attached figures without any creative effort.

DETAILED DESCRIPTION OF THE DISCLOSURE

The following descriptions for the respective embodiments are specific embodiments capable of being implemented for illustrations of the present invention with referring to appending figures. In describing the present invention, spatially relative terms such as "upper", "lower", "front", "back", "left", "right", "inner", "outer", "lateral", and the like, may be used herein for ease of description as illustrated in the figures. Therefore, the spatially relative terms used herein are intended to illustrate the present invention for ease of understanding, but are not intended to limit the present invention. In the appending drawings, units with similar structures are indicated by the same reference numbers.

The existing quantum dot liquid crystal display cannot efficiently control the non-polarized characteristic of quantum dot light emission, resulting in difficult for a liquid crystal panel to carry out a display of a complete dark state or a black image, and also resulting in low efficiency in screen brightness, thereby affecting the effect of a displayed image. As per this technical problem, the present invention can solve the drawbacks.

Figure 1:
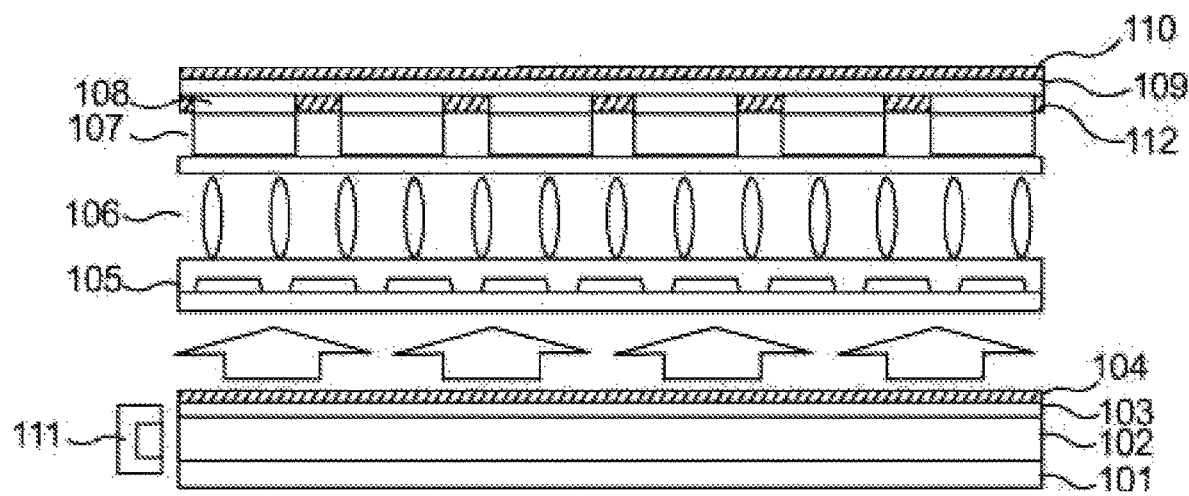
FIG. 1 is a schematic structural diagram showing an existing quantum dot liquid crystal display device.
Figure 2:
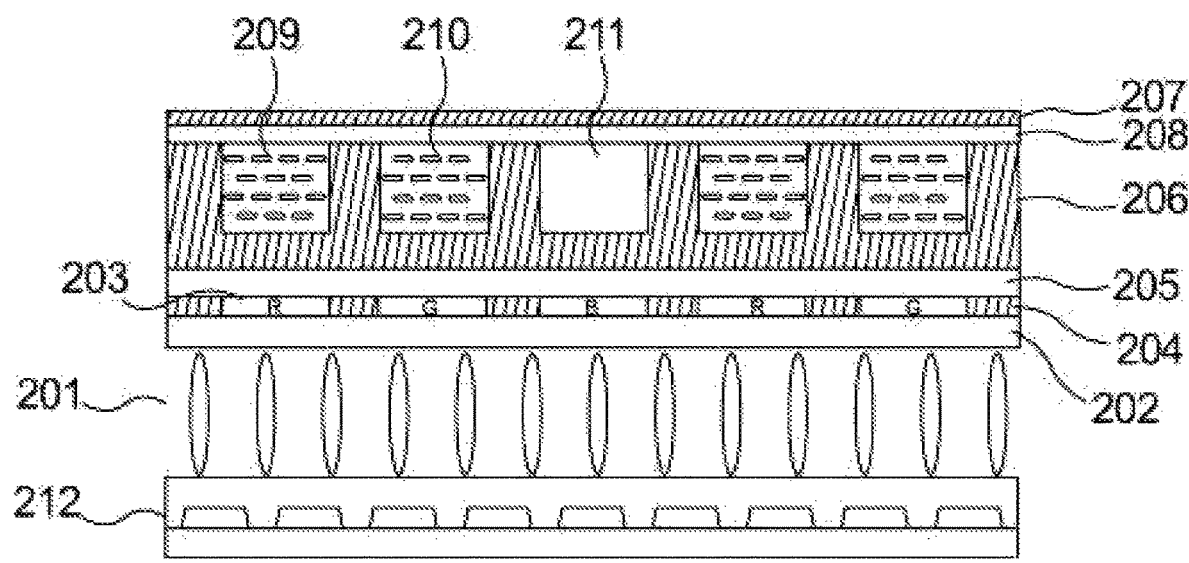
FIG. 2 is a schematic structural diagram showing a display device in accordance with the present invention.

As shown in FIG. 2, the display device of the present invention includes a backlight module and a liquid crystal display panel disposed above the backlight module.

The backlight module includes a light guiding plate, a reflection plate disposed on a lower surface of the light guiding plate, an optical film disposed on an upper surface of the light guiding plate, and a blue light source disposed on a light-entrance side of the light guiding plate. The optical film has a lower polarization plate disposed thereon.

The liquid crystal display panel includes an array substrate 212 and a color filter substrate 202. The array substrate 212 and the color filter substrate 202 have a liquid crystal layer 201 disposed therebetween. The color filter substrate 202 has a color resistant layer 203 and a first black matrix 204 manufactured on an upper surface thereof. The color resistant layer 203 has a flat layer 205 manufactured on a surface thereof. The flat layer 205 has a quantum rod light-emitting layer disposed on a surface thereof.

The quantum rod light-emitting layer includes a plurality of separation members 206 distributed in a form of array. Each separation member has a concave part formed therein. The concave part is filled with a quantum rod material. The quantum rod light-emitting layer has an upper polarization plate 207 disposed thereon. Preferably, the size of an opening of the concave part corresponds to that of an opening of a corresponding sub-pixel. Preferably, the surface of the quantum rod light-emitting layer is coated by a water vapor and oxygen insulation layer 208 in order to prevent water vapor and oxygen from affecting the photoelectric property of the quantum rod as well as its lifespan.

The color resistant layer 203 is divided into a plurality of red (R), green (G), and blue (B) sub-pixels by the first black matrix 204. Each separation member 206 is disposed corresponding to one sub-pixel and arranged above said one sub-pixel. The color of the quantum rod material in the separation member 206 corresponds to that of the sub-pixel located below the quantum rod material. That is, a red quantum rod material 209 is correspondingly disposed above the red sub-pixel, and a green quantum rod material 210 is correspondingly disposed above the green sub-pixel. However, a transparent material 211 is correspondingly disposed above the blue sub-pixel.

Taking a normally black mode for example and assuming that transmission axes of the upper polarization plate and the lower polarization plate are perpendicular to each other, the orientation of the quantum rods is consistent with the transmission axis of the upper polarization plate. After passing through the lower polarization plate, the blue light emitted from the backlight source is turned to a polarized light. When the liquid crystal is at an off-state voltage, the polarization direction of the blue light passing through the liquid crystal layer 201 remains unchanged. That is, the polarization direction of the blue light is perpendicular to the orientation of the quantum rods. The quantum rods cannot be effectively excited by the blue light to emit light rays. Therefore, there is no light able to pass through the upper polarization plate and a dark state output is formed. When an on-state voltage is applied between the liquid crystal, the polarization direction of the polarized blue light passing through the liquid crystal layer 201 is parallel to the transmission axis of the upper polarization plate. That is, the polarization direction of the blue light is consistent with the orientation of the quantum rods. Therefore, the quantum rods can be excited to the greatest extent to emit light rays, and the light rays can pass through the upper polarization plate successfully and a white state output is formed. It is obvious that during the white state output, the red quantum rods and the green quantum rods are excited by the blue light, and thus outputs of red, green, and blue patterns can be formed. Meanwhile, the polarization of an output light is consistent with that of the upper polarization plate. There does not exist any energy loss. Therefore, as compared to a light resistant structure of a traditional color filter, the transmission rate is dramatically improved, and an excellent brightness efficiency is exhibited as well as a high color gamut property.

The quantum rod is a core-shell structure and the center of the quantum rod has a quantum dot. The quantum rod is a quantum rod of a core-shell structure mainly consisted of the II-VI group semiconductor material (such as CdS, CdSe, HgTe, ZnS, ZnSe, ZnTe, and HgS), the III-V group semiconductor material (such as InP, InAs, GaP, and GaAs), or the IV-VI group nanostructured semiconductor material. The particle size of the quantum dot is preferred to be 1-10 nm. The particle sizes of the quantum dots corresponding to the red and the green quantum rods are different from each other. Therefore, different levels of quantum confinement effect can carry out light emission of different wavelengths. Commonly used ligands such as Tri-n-octylphosphine (TOP) and Tri-n-octylphosphine Oxide (TOPO) can be selected as ligands of the quantum rod.

As similar to the quantum dot, the quantum rod possesses a narrow-linewidth emission property, and the wavelength of which correlates to the material and the size of its corresponding quantum dot. Therefore, the quantum rod can be served as an ideal backlight of high color gamut. Different from the traditional quantum dot structure, the quantum rod has a large transversal size which plays a role in modulating the quantum dot light emission in the core, and therefore light emission of the quantum rod is usually polarization selective and its polarization direction is usually parallel to the orientation of the quantum rod. The degree of polarization can reach 0.7. This means only a few amount of emitted light rays are polarized in a direction perpendicular to the orientation of the quantum rod. The emitted light rays polarized in a direction parallel to the orientation of the quantum rod lead to a higher quantum efficiency.

The separation member 206 is an SU-8 photoresist, which is a transparent material 211 at visible wavelengths. The SU-8 photoresist is a chemically amplified negative photoresist having excellent light sensitivity and high aspect ratio. It overcomes the problem of poor aspect ratio caused in a common UV lithographic technique. Also, it does not have the problem of high process cost. The SU-8 photoresist has a low optical absorption characteristic in response to ultraviolet light. Even though the film thickness is up to 1000 microns, the edge of a resulting pattern is still almost vertical.

Figure 3:
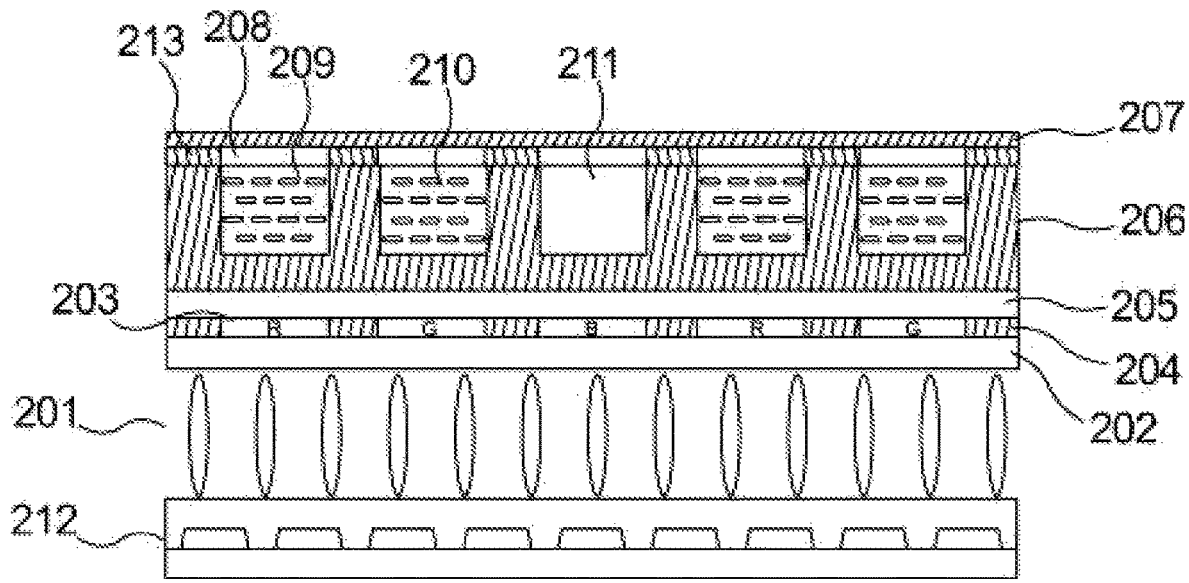
FIG. 3 is a schematic structural diagram of an alternative preferred embodiment of FIG. 2.

As shown in FIG. 3, the film of the quantum rod requires a sufficient thickness to assure the light efficiency. The thickness of the SU-8 separation member 206 is about 10-30 μm, which is greater than a gap thickness of the traditional liquid crystal module. As a result, color interferences will easily occur between different sub-pixels during the light rays pass through the liquid crystal cells, thereby resulting in color deviation at large viewing angle. Therefore, in order to reduce the color deviation at large viewing angle, the water vapor and oxygen insulation layer 208 has a second black matrix 213 manufactured on a surface thereof. The positions of openings of the second black matrix 213 corresponds to that of the first black matrix 204.

In the quantum rod material, all of the quantum rods are arranged along a same direction, and its orientation is consistent with the transmission axis of the upper polarization plate on the upper surface of the color filter substrate 202. The alignment principle of the quantum rod material is similar to that of the liquid crystal.

Figure 4:
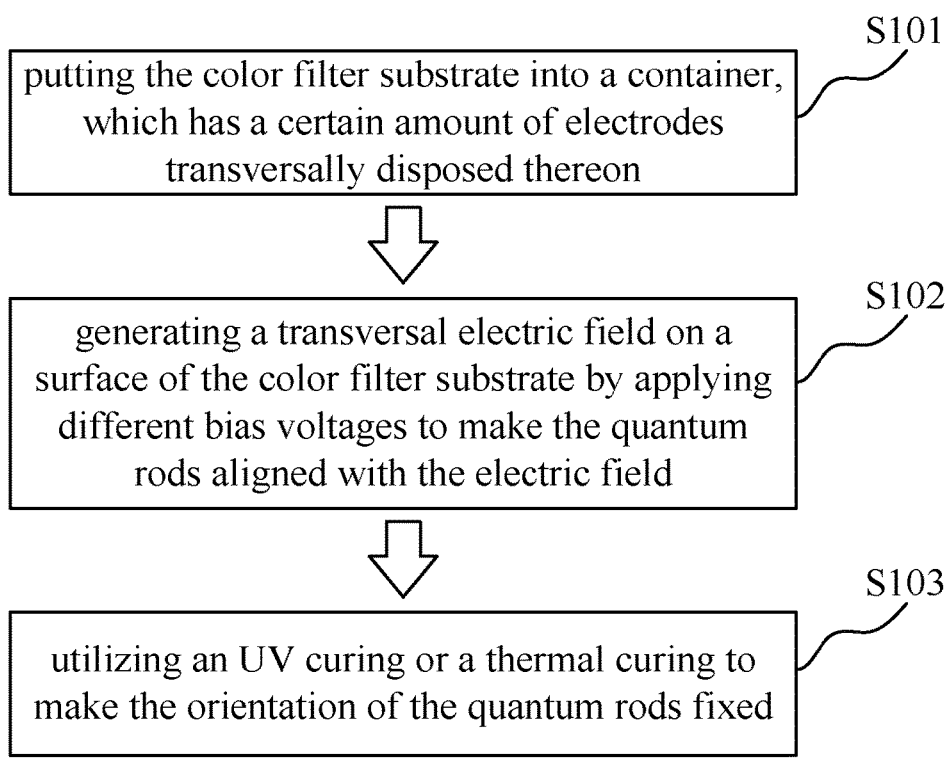
FIG. 4 is a flow chart of a method for aligning a quantum rod material.

As shown in FIG. 4, the alignment of the quantum rod material includes specific steps as follows. In Step S101, putting the color filter substrate 202 into a container, which has a certain amount of electrodes transversally disposed thereon. In Step S102, generating a transversal electric field on a surface of the color filter substrate 202 by applying different bias voltages to make the quantum rods aligned with the electric field. In Step S103, utilizing an UV curing or a thermal curing to make the orientation of the quantum rods fixed.

The beneficial effects of the present invention are described below. Compared to the existing quantum dot liquid crystal display device, the display device of the present invention has a quantum rod light-emitting layer with polarization ability disposed on an external surface of a liquid crystal layer. By a combination of excitation of the quantum rod, polarization property of fluorescence spectroscopy, and ability of the liquid crystal to change polarization, a quantum dot television having high brightness and high color gamut can be carried out.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A display device, comprising:
   a liquid crystal display panel; and
   a blue backlight module disposed on a lower surface of the liquid crystal display panel, configured to provide a backlight for the liquid crystal display panel,
   wherein the liquid crystal display panel comprises:
   an array substrate;
   a color filter substrate disposed on an upper surface of the array substrate, the color filter substrate having a color filter layer and a first black matrix disposed on a surface of the color filter substrate and having a flat layer disposed on an upper surface of the color filter layer, wherein the color filter layer is located between the flat layer and the color filter substrate; and
   a quantum rod light-emitting layer disposed on an upper surface of the flat layer,
   wherein the quantum rod light-emitting layer comprises:
   a plurality of separation members arranged in a form of array and a quantum rod material manufactured in the separation members, wherein the plurality of separation members are located on the flat layer, and each of the separation members has a concave part formed therein and the concave part is filled with the quantum rod material, wherein each concave part has an opening that is exposed at a side of the plurality of separation members opposite to the flat layer,
   wherein each separation member is disposed corresponding to one sub-pixel of the color filter layer and arranged above said one sub-pixel, a color of the quantum rod material in the separation member corresponds to that of the sub-pixel of the color filter layer located below the quantum rod material, and all of quantum rods in the quantum rod material are arranged along a same direction,
   wherein the backlight module has an optical film which has a lower polarization plate disposed thereon, the quantum rod light-emitting layer has an upper polarization plate disposed thereon, and transmission axes of the upper polarization plate and the lower polarization plate are perpendicular to each other,
   wherein the orientation of the quantum rods is consistent with the transmission axis of the upper polarization plate located above the color filter substrate.

2. The display device according to claim 1, wherein the separation members are a SU-8 photoresist, which is a transparent material at visible wavelengths.

3. The display device according to claim 1, wherein the size of the opening of the concave part corresponds to that of an opening of a corresponding sub-pixel.

4. The display device according to claim 1, wherein the quantum rod light-emitting layer has a water vapor and oxygen insulation layer disposed on an upper surface thereof.

5. The display device according to claim 4, wherein the water vapor and oxygen insulation layer has a second black matrix manufactured on a surface thereof, and the positions of openings of the second black matrix corresponds to that of the first black matrix.

6. The display device according to claim 1, wherein the quantum rod is a core-shell structure and a center of the quantum rod has a quantum dot.

7. The display device according to claim 6, wherein a particle size of the quantum dot is selected to be 1-10 nm, and the particle sizes of red and green quantum dots are different from each other.

* * * * *